(12) United States Patent
Reeson

(10) Patent No.: US 6,889,887 B1
(45) Date of Patent: May 10, 2005

(54) BOILER WATER WALL TUBE PANEL ALIGNING JACK DEVICE

(75) Inventor: William G. Reeson, 6484 Landing Rd., King George, VA (US) 22485

(73) Assignee: William G. Reeson, King George, VA (US)

( * ) Notice: Subject to any disclaimer, the term of this patent is extended or adjusted under 35 U.S.C. 154(b) by 45 days.

(21) Appl. No.: 10/743,486

(22) Filed: Dec. 21, 2003

(51) Int. Cl.[7] .............................................. B23K 37/04

(52) U.S. Cl. .................. 228/49.1; 228/44.5; 29/890.03

(58) Field of Search ............................ 228/49.1, 49.3, 228/49.4, 44.5, 212, 213, 182, 183; 269/43, 269/87, 99, 165, 265; 29/890.03, 890.031, 29/33 T, 271; 219/161, 158

(56) References Cited

U.S. PATENT DOCUMENTS

| | | | | |
|---|---|---|---|---|
| 4,498,820 A | * | 2/1985 | Brennan | ...................... 409/179 |
| 4,830,551 A | * | 5/1989 | Brennan et al. | .............. 408/82 |
| 4,846,391 A | * | 7/1989 | McClure | .................... 228/49.3 |
| 4,936,500 A | * | 6/1990 | McClure | .................... 228/44.5 |
| 5,044,075 A | * | 9/1991 | Brennan et al. | ........ 29/890.031 |
| 5,083,372 A | * | 1/1992 | Polutnik et al. | ........ 29/890.043 |
| 5,481,793 A | * | 1/1996 | McClure | ...................... 29/726 |
| 5,542,177 A | * | 8/1996 | Hillestad | ................. 29/890.03 |
| 5,582,538 A | * | 12/1996 | Hillestad | .................... 451/154 |

* cited by examiner

Primary Examiner—Jonathan Johnson
(74) Attorney, Agent, or Firm—Donald W Meeker

(57) ABSTRACT

A boiler water tube panel alignment device comprising a hydraulic jack system built into a clamp which secures to a metal tab welded to the existing water tube panel. The hydraulic jack is mounted over the new water tube panel to provide the power required for aligning the two boiler water tube panels for welding them together.

4 Claims, 2 Drawing Sheets

BOILER WATER WALL TUBE PANEL ALIGNING JACK DEVICE

BACKGROUND OF THE INVENTION

1. Field of the Invention

The present invention relates to mechanisms that hold workpieces in position for welding abutting edges and particularly to a hydraulic jacking device for aligning and welding boiler water wall panels.

2. Description of the Prior Art

Large utility boiler furnace walls are manufactured from tubing welded with membrane between the tubes to form panels which when welded together make a water cooled firebox wall to contain fire. These panels are frequently replaced because of wear, corrosion and fatigue. The panels of tube banks that need replacement are generally cut out using a power saw or a cutting torch. When new panels and old existing panels are required to be fit together, they require jacking with extreme force to make them fit due to the warpage of the old panel Many devices have been invented and employed to align workpieces that are to be welded together and to support these materials during the welding process. Prior art patents provide aligning clamp devices and welding fixtures or jigs. None of the prior art patents provide a jacking device for boiler water wall tube panels.

Prior art U.S. Pat. No. 4,081,651, Mar. 28, 1978 to Randolph, shows apparatus for supporting and rotating a pair of hollow tank sections of generally circular cross section, including scalene frusto-conical tank sections, during welding of the sections in end-to-end abutting relation to form an elongated tank. The apparatus includes three longitudinally spaced, axially aligned, rotatable rings which define a welding cage. The center ring includes a plurality of circumferentially spaced, radially directed jacks, each extendible the same distance regardless of the resistance encountered by a particular jack to force the abutting edges of the tank sections into a precise circular cross section and support and hold the abutting edges in aligned relation during rotation and welding. The two side rings include circumferentially spaced radially directed jacks of the seek and find type that will automatically extend until all jacks exert the same force on the tank sections extending from each side of the center ring to thereby support the tank sections for rotation about the common axis of the three rings, regardless of whether the tank sections are of cylindrical, right frusto-conical or scalene frusto-conical shape. A longitudinally extending conveyor is provided which extends within the welding cage and on either side of the welding cage for moving adjacent tank sections longitudinally toward each other into abutting engagement for welding, and for moving welded sections longitudinally of the cage.

Prior art U.S. Pat. No. 4,475,726, issued Oct. 9, 1984 to Smith, provides a rugged sturdy workpiece positioning mechanism that effectively and efficiently positions and holds at least two workpieces for further operations. The mechanism includes a main support that is slidably connected to a first workpiece and a housing assembly, which is affixed to the main support and extends above and engages the second workpiece. The housing assembly includes two side plates, a cam with a handle rotatably attached to the sideplates, a ratchet to lock the cam into a fixed position and a load bearing surface actuated by the cam and slidably received between the side plates. The edge of the cam abuts the load-bearing member. When the cam is rotated in a predetermined direction, the distance between its axis of rotation and the load bearing member increases driving the load bearing member downward. The load-bearing surface engages the workpiece and forces the second workpiece into a desired position relative to the first workpiece. Once the joining operation is completed, the mechanism is slidably detached from the workpieces.

Prior art U.S. Pat. No. 5,542,177 issued Aug. 6, 1996 and U.S. Pat. No. 5,356,248 issued Oct. 18, 1994 both to Mark W. Hillestad, show a method and apparatus for repairing boiler tube walls by cutting out and replacing a worn or damaged section thereof involving the use of a power tool having a rotary milling head specially adapted to remove membrane material from between tube ends which are exposed when the damaged section is removed and optionally to simultaneously bevel the end of a tube as membrane material is being removed. The method and apparatus of the invention allows for the rapid and precise removal of membrane material from between the exposed tube ends to facilitate subsequent beveling and welding operations or for concurrent beveling and membrane removal, while substantially reducing the risk of weakening or damaging the tube wall by avoiding excess removal of material therefrom.

Prior art U.S. Pat. No. 4,739,688 issued Apr. 26, 1988 and U.S. Pat. No. 4,830,551 issued May 16, 1989 and U.S. Pat. No. 5,044,075 issued Sep. 3, 1991 all to Matthew T. Brennan and James A. Moruzzi, provide boiler tube repair apparatus including elongated guide rail structure for securing to a boiler tube panel adjacent a desired cut region, and three tool assemblies for mounting on the guide rail structure. Each tool assembly includes carriage structure with guide structure for engaging the guide rail structure and support structure on which a tube machining tool is mounted and that defines a tool movement axis dedicated to and coordinated with that tool. Each machining tool includes a drive motor, a manual motor control, a drive shaft and a machining member such as a cutter disc or head.

Prior art U.S. Pat. No. 5,511,717, issued Apr. 30, 1996 to Uusitalo, concerns a device for aligning the edges of plate-like bodies for welding the edges together. The device comprises a plate-like support member to be inserted into a gap between the edges to be welded, and support means positioned on the opposite sides of the plates and arranged to press the edges of the bodies to be welded into the same plane.

Prior art U.S. Pat. No. 3,182,988, issued May 11, 1965 to Woodall, claims a welding fixture or jig whereby two steel plates or the like may be disposed in a fixed relationship to one another to permit welding of the plates together. The welding fixture is seated upon lugs that are welded to the plates. Wedges are provided which engage the holding lugs to urge the plates into alignment. A large passageway is provided in the fixture for welding access to the abutting edges of the two steel plates.

Prior art U.S. Pat. No. 2,101,856, issued Dec. 14, 1937 to Hines, discloses a welding apparatus that comprises a plate apertured to receive apertured holding lugs on members to be welded together. The apparatus also comprises wedges adapted to be driven through the apertures in the holding lugs to draw the members against the plate. The apparatus further comprises a shoulder on the plate adjacent to an aperture in it and a wedge adapted to be driven between a holding lug and the shoulder to shift the member laterally with respect to the plate.

Prior art U.S. Pat. No. 2,306,032, issued Dec. 22, 1942 to Baumgard, puts forth a coupling apparatus for butt-welding sheet metal structures. The device comprises a bridging member that extends across the adjacent edges of the members to be welded. The bridging member has apertures for receiving apertured lugs attached to the sheet metal structures. The device further comprises wedges for engaging slots in the bridge member and the lugs, which causes the sheet metal structures to become aligned.

Prior art U.S. Pat. No. 2,469,965, issued May 10, 1949 to Holt, indicates an aligning clamp for holding plate material to be welded along adjoining edges. The clamp comprises an elongated strap member, which is set on edge transversely across the gap between the plates and matches the curve of said plates. U-shaped members are welded to the plates and straddle the elongated strap. Tapered tension pins are wedged between the closed end of the U-shaped members and the elongated strap, thereby causing the plate members to align with one another.

What is needed is a hydraulic jack system for the power required to align boiler water tube panels.

SUMMARY OF THE INVENTION

An object of the present invention a hydraulic jack system built into a clamp which secures to a metal tab welded to the existing water tube panel with the hydraulic jack mounted over the new water tube panel to provide the power required to align the two boiler water tube panels for welding them together.

Another object of the present invention is to provide a hydraulic jacking device that fits a variety of sizes of boiler water tube panels, which may also be used to jack panels or beams into position.

One more object of the present invention is to provide a hydraulic jack that enables a precision alignment with ease due to the power provided which would otherwise be difficult to carry out easily and otherwise difficult to provide a precise alignment.

An additional object of the present invention is to provide a hydraulic jacking device that can accurately align warped panels.

A further object of the present invention is to provide a metal tab that is welded on one side only to a web between two tubes which allows the tab to be broken away and reused on another boiler water tube panel.

In brief, a jacking device for alignment of boiler tube panels that comprises a hydraulic jack system built into a clamp, which secures to a metal tab welded to the existing water tube panel. The metal tab is welded on one side only to the web between two tubes of an existing boiler tube panel, thereby allowing the tab to be broken away and reused on another boiler water tube panel. The device further includes a rigid bracket comprising a tab sleeve, which fits over the metal tab. The tab sleeve has a pair of mating spaced openings matched and aligned with the pair of spaced openings in the metal tab. The rigid bracket further comprises a pair of pins attached thereto by chains, which fit in the mating openings to secure the tab sleeve to the tab. The rigid bracket also comprises a flat plate secured to and extending orthogonally from the tab sleeve, the flat plate rests against and spans a series of water tubes of an existing water tube panel having the metal tab attached thereto. The rigid bracket further comprises a jack sleeve rigidly attached to the tab sleeve and a rigid angled support arm between the jack sleeve and the flat plate. The jack sleeve extends away from the existing water tube panel, and has a means for receiving and housing the hydraulic jack therein. A bolt on the hydraulic jack is slidably adjustable within a slot on the jack sleeve. Once the jack adjusted with its outer head touching the new boiler tube panel, the jack is held in place by tightening the bolt down. When the jack is positioned over the new water tube panel, it provides the power required for aligning the two boiler water tube panels for welding them together. The jacking device is a very safe and efficient tool that greatly increases the speed and accuracy of membrane fitup. The jacking device may be also be used for other applications, such as jacking plates and beams into place.

An advantage of the present invention is that it is easy to use.

Another advantage of the present invention is that it is reusable.

An additional advantage of the present invention is that it requires no welding on the boiler tube surface.

One more advantage of the present invention is that it will not damage the boiler tubes.

Yet another advantage of the present invention is that it is safe to use.

Still another advantage of the present invention is that it is a very efficient tool.

An auxiliary advantage of the present invention is that it increases speed and accuracy.

A further advantage object of the present invention is that it reduces labor costs.

Another advantage of the present invention is that it may be used on warped panels.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
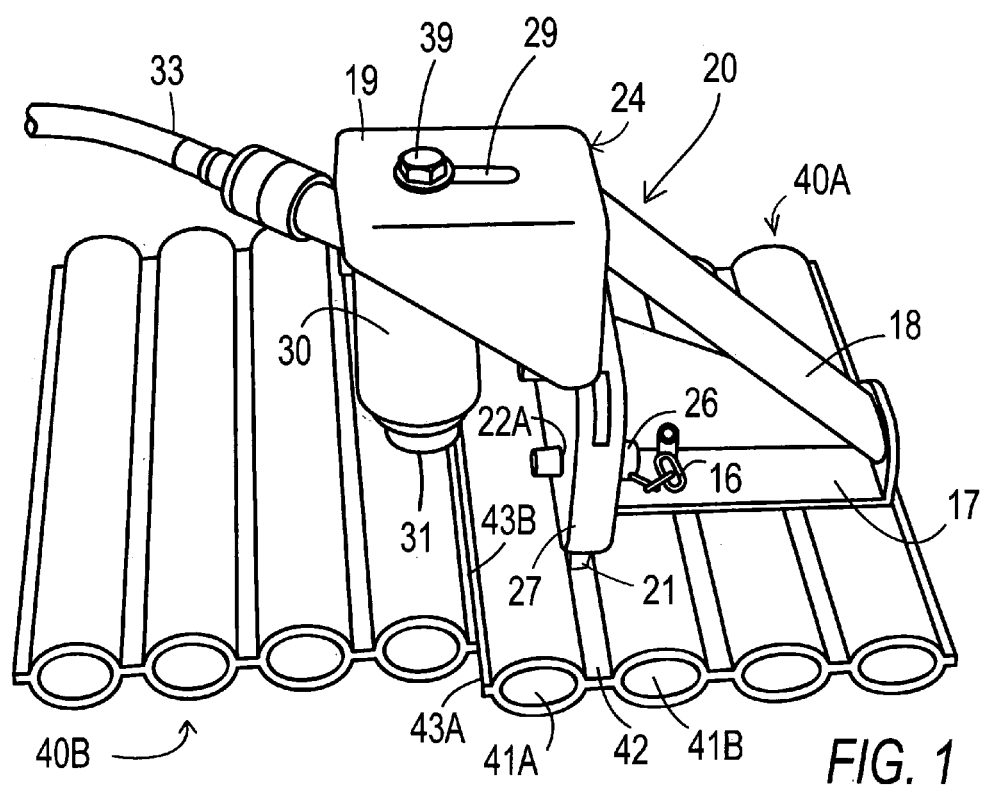
FIG. 1 is a perspective view of the hydraulic jack water tube aligning device of the present invention mounted between two boiler water tube panels to be welded together.
Figure 2:
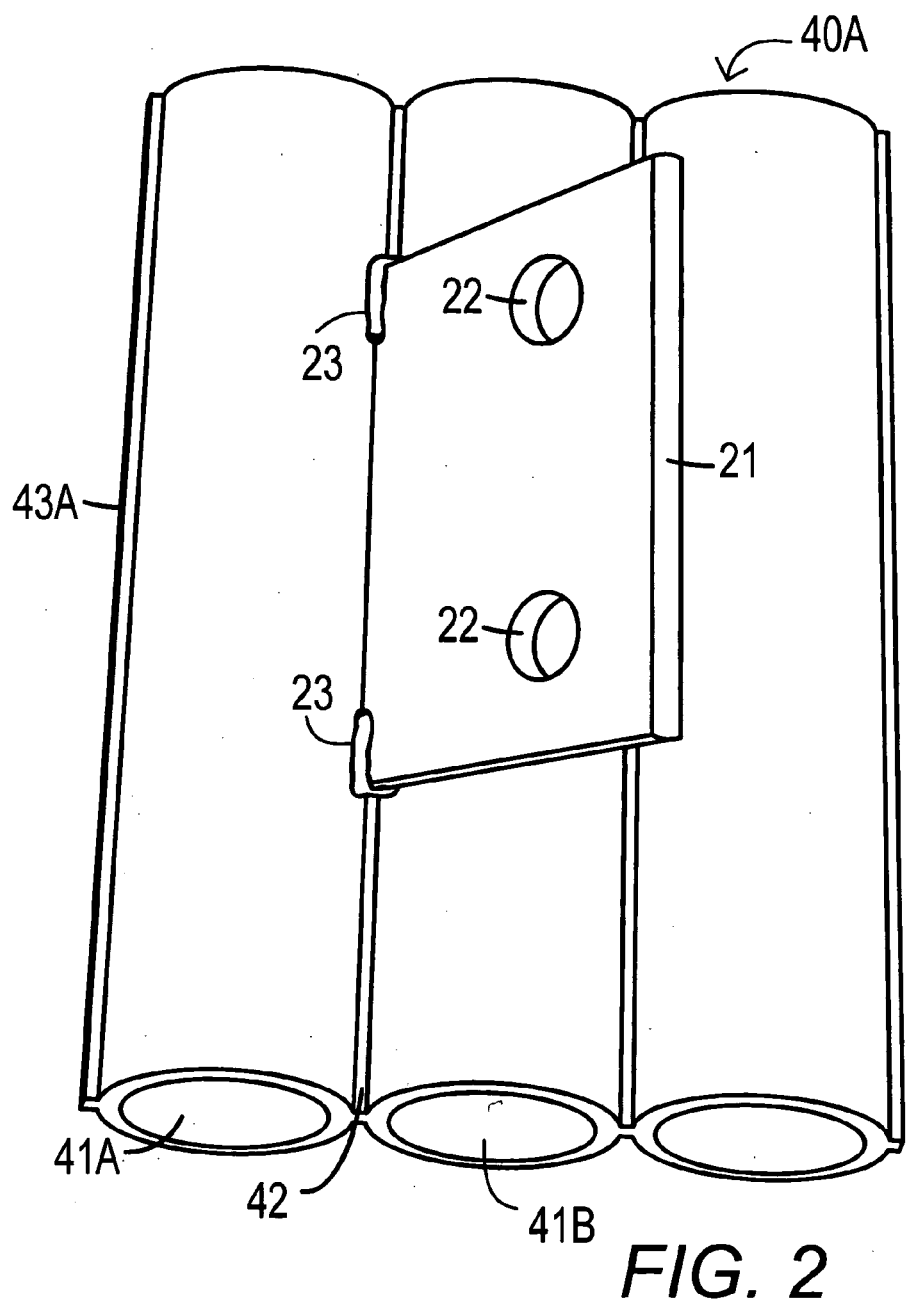
FIG. 2 is a perspective view of the metal tab for receiving the device of FIG. 1 attached between a first and second tube on an existing water tube panel to receive the device of FIG. 1 for welding another water tube panel to the existing water tube panel.

In FIGS. 1 and 2, a hydraulic jack device 20 for aligning boiler water tube panels 40A and 40B to weld the panels 40A and 40B together, the device 20 comprising a hydraulic jack 30 with a hydraulic cylinder and a movable piston with an outer head 31 adapted for applying force sufficient to move a boiler water tube panel 40B.

The device 20 also comprises a rigid metal tab 21 adapted for attachment by a weld 23 to a web 42 between a first and second of a pair of tubes 41A and 41B in a first boiler water tube panel 40A, the existing in-place panel. The metal tab 21 has a pair of spaced openings 22 transversely therethrough, as seen in FIG. 2. The weld 23 attaching the metal tab 21 to a first boiler water tube panel 40A comprises a weld 23 along only one side of the metal tab 21 so that the metal tab 21 may be broken away and reused on another boiler water tube panel.

The device 20 further comprises a rigid bracket 24 comprising a tab sleeve 27, which fits over the metal tab 21. The tab sleeve 27 has a pair of mating spaced openings 22A matched and aligned with the pair of spaced openings 22 in the metal tab 21. The rigid bracket 24 further comprises a pair of pins 26 attached thereto by chains 16, which fit in the mating openings 22 and 22A to secure the tab sleeve 27 to the tab 21, as shown in FIG. 1.

The rigid bracket 24 further comprises a flat plate 17 secured to and extending orthogonally from the tab sleeve 27, preferably welded thereto. The flat plate 17 rests against and spans a series of water tubes of the first water tube panel 40A having the metal tab 21 attached thereto. The rigid bracket 24 further comprises a jack sleeve 19 rigidly attached to the tab sleeve 27 and a rigid angled support arm 18 between the jack sleeve 19 and the flat plate 17, preferably all welded together.

The jack sleeve 19 extends away from the first water tube panel 40A, and houses the hydraulic jack 30 therein. The jack sleeve 19 also has a means for adjusting a position of the hydraulic jack 30 within the jack sleeve 19 so that the outer head 31 of the hydraulic jack 30 may contact a second boiler water tube panel 40B and may align the first and second adjacent boiler water tube panels 40A and 40B for welding the first and second boiler water tube panels 40A and 40B together. The means for adjusting comprises a bolt 39 extending from the hydraulic jack 30 into a slot 29 in the jack sleeve 19 extending orthogonally away from the tab plate 21 so that the bolt 39 from the hydraulic jack 30 fits within and is adapted to slide within the slot 29 to adjust the position of the hydraulic jack 30, which position is secured by tightening the bolt 39.

In practice, no welding is done on the surface of the boiler tubes 41A and 41B to perform the set up. The metal tab 21 is welded 23 on one side only to a web 42 between the first 41A and second tubes 41B of the existing water tube panel 40A, as shown in FIG. 2. The tab sleeve 27 of the rigid bracket 24 is slipped over the metal tab 21 with the flat plate 17 contacting a number of tubes on the existing panel 40A. The two pins 26 are inserted through the mating openings 22 and 22A to secure the tab sleeve 27 to the tab 21.

The hydraulic jack 30 is positioned by sliding the jack 30 in the jack sleeve 19 until the outer head 31 of the jack 30 comes into contact with the new water tube panel 40B. The jack 30 is held in place by tightening the bolt 39 down on slot 29 in the jack sleeve 19, thereby holding the jack 30 in position.

The jack 30 then provides the hydraulic power required for aligning the second water tube panel 40B with the existing panel 40A to weld them together. When the edges 43A and 43B of the panels 40A and 40B are properly jacked into alignment, as shown in FIG. 1, they may be welded together. Since the metal tab 21 is only welded 23 on one side, as shown in FIG. 2, the tab 21 can be broken off and reused on another panel 40A. The jacking device 20 may be also be used for other applications, such as jacking plates and beams into place.

It is understood that the preceding description is given merely by way of illustration and not in limitation of the invention and that various modifications may be made thereto without departing from the spirit of the invention as claimed.

What is claimed is:

1. A hydraulic jack device for aligning boiler water tube panels to weld the panels together, the device comprising:
   a hydraulic jack comprising a hydraulic cylinder and a movable piston with an outer head adapted for applying force sufficient to move a boiler water tube panel;
   a rigid metal tab adapted for attachment by a weld to a web between a first and second of a pair of tubes in a first boiler water tube panel, the metal tab having a pair of spaced openings transversely through the metal tab;
   a rigid bracket comprising a tab sleeve adapted to fit over the metal tab, the tab sleeve having a pair of mating spaced openings matched and aligned with the pair of spaced openings in the metal tab, the rigid bracket further comprising a pair of pins attached thereto by chains, the pair of pins adapted to fit in the mating openings to secure the tab sleeve to the tab, the rigid bracket further comprising a flat plate secured to and extending orthogonally from the tab sleeve, the flat plate adapted to rest against and span a series of water tubes of a first water tube panel having the metal tab attached thereto, the rigid bracket further comprising a jack sleeve rigidly attached to the tab sleeve, the jack sleeve extending away from the first water tube panel, the jack sleeve having a receiving means and a housing means for the hydraulic jack therein, the jack sleeve having an adjusting means to position the hydraulic jack within the jack sleeve so that the outer head of the hydraulic jack is adapted to contact a second boiler water tube panel and adapted to align the first and second boiler water tube panels for welding the first and the second boiler water tube panels together.

2. The device of claim 1 wherein the rigid bracket further comprises a rigid angled support arm between the jack sleeve and the flat plate.

3. The device of claim 1 wherein the hydraulic jack further comprises a bolt extending therefrom to attach the hydraulic jack to the jack sleeve and the adjusting means to position the hydraulic jack within the jack sleeve comprises a slot in the jack sleeve extending orthogonally away from the tab plate so that the bolt from the hydraulic jack fits within and is adapted to slide within the slot to adjust the position of the hydraulic jack, which position is secured by tightening the bolt.

4. The device of claim 1 wherein the weld attaching the metal tab to the first boiler water tube panel comprises a weld along only one side of the metal tab so that the metal tab is adapted to be broken away and reused on another boiler water tube panel.

* * * * *